April 5, 1932.  C. P. HARRISON  1,852,517
REEL
Filed Nov. 11, 1929
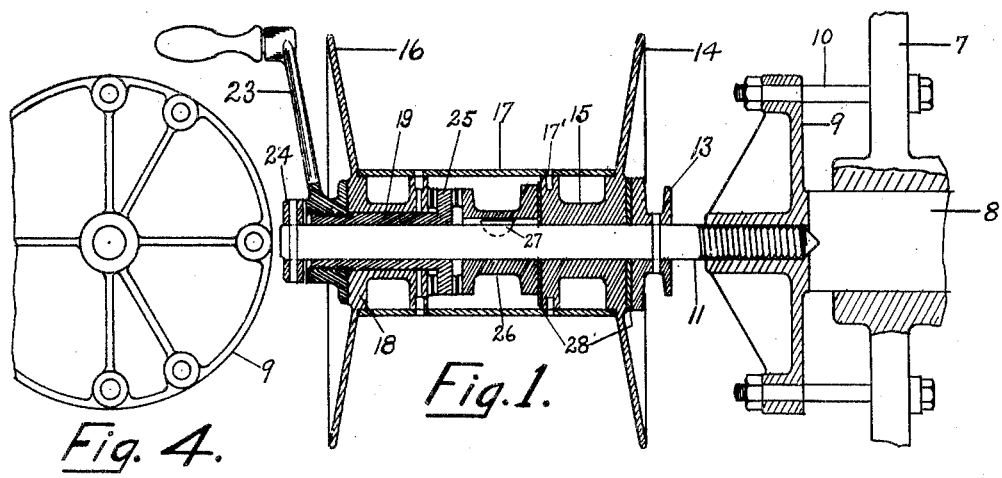
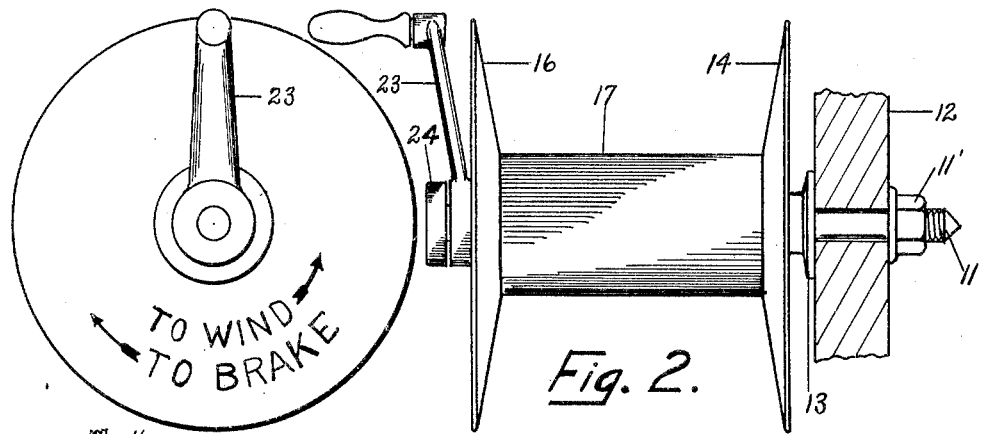
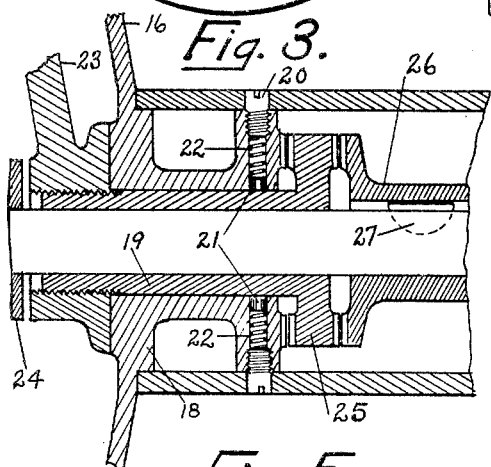
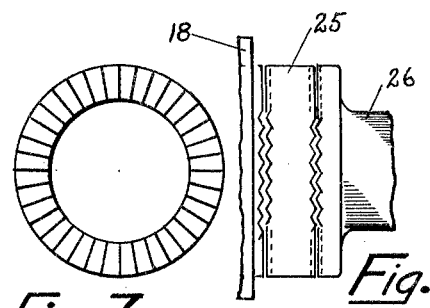
INVENTOR.
Charles P. Harrison.
by
ATTORNEY Patented Apr. 5, 1932

1,852,517

UNITED STATES PATENT OFFICE

CHARLES P. HARRISON, OF WESLEYVILLE, PENNSYLVANIA, ASSIGNOR TO JARECKI MANUFACTURING CO., OF ERIE, PENNSYLVANIA, A CORPORATION OF PENNSYLVANIA

REEL

Application filed November 11, 1929. Serial No. 406,431.

My said invention relates to a reel intended particularly for use with measuring lines such as are used on oil wells and other deep wells, but useful also in other connections. It is an object of my invention to provide a reel of this character with a single handle which is effective either to wind up the line or to regulate braking means for the reel.

Another object of my invention is to provide means in connection with a single handle whereby the line can be wound up by turning the handle in one direction and braking tension can be imparted to the reel or regulated by turning the handle in the other direction.

Another object of the invention is to provide means whereby a single handle can be operated to give a positive locking action for winding by turning the handle in one direction and a variable braking tension by turning the handle in the opposite direction.

Another object of the invention is to provide improved means for connecting the reel to power operating means therefor:

Referring to the drawings which are made a part of this application, and in which similar reference characters indicate similar parts:

Fig. 1 is a central longitudinal section through the reel showing the mounting of the same to an engine shaft and fly wheel, Fig. 2, a side elevation of the reel mounted on a stationary structure, Fig. 3, an end elevation of the reel when viewed from the left, Fig. 4, an end elevation of the reel clamp when viewed from the left, Fig. 5, an enlarged partial, central, longitudinal section, Fig. 6, a side elevation showing the construction of the clutches, and Fig. 7, an end view of said clutches.

In the use of a measuring line reel for deep wells the reel may be attached to an engine shaft as shown in Fig. 1, thereby providing power operating means for winding the measuring line on the reel, but for a shallow well the customary method of use is to mount the reel on a stationary structure and operate the same by hand, as shown in Fig. 2.

In the drawings reference character 7 indicates a portion of a fly wheel of an engine, such fly wheel being mounted on a shaft 8, it being understood that the devices hereinafter described may be connected to any suitable power operated shaft for operating the reel. In the embodiment of the invention here illustrated a disk 9 is provided which disk has a sufficient number of holes formed about its periphery to enable the disk to be firmly secured to a fly wheel or the like in such a manner as to avoid the wobbling that is found to occur with previous constructions. At least three such holes are provided at substantially equally spaced points about the periphery of the disk and preferably at least four holes are provided at the ends of diameters of the disk which diameters are perpendicular to each other. Three such holes are shown in Fig. 4 and a fourth hole (not shown) is preferably arranged at the left hand end of the horizontal diameter indicated. In addition to this it is desirable to provide two holes approximately fifteen degrees distant from those at the ends of one diameter, so that bolts 10 in said holes may conveniently pass between the spokes of fly wheels having four, six or eight spokes and thereby support the disk firmly in all directions. In previous practice it has been usual to provide only two bolts at opposite ends of a line passing through the axis of the shaft and those of said bolts, but this gives very little support to the disk except on that line. A shaft 11 has one end threaded to engage a threaded aperture at the center of the disk 9, said threaded end also providing convenient means for receiving a nut 11' whereby the shaft may be secured to a fixed support 12, which nut is turned up sufficiently to bring a collar 13 up against the fixed support. The collar 13 is secured to the shaft 11 by a key or in any other suitable manner.

The reel comprises flanges 14 and 16, one of said flanges having integral therewith a substantially cylindrical hub 15 provided with friction faces at its ends. A tubular intermediate member or drum 17 surrounds the hub of flange 14 and is secured thereto by pins 17'.

Flange 16 has an integral hub 18 journaled on a sleeve 19 and the sleeve 17 is positively connected to the hub 18 by screws 20 which also serve to connect the hub 18 frictionally to the sleeve 19 by means of friction plugs 21 bearing on said sleeve and springs 22 interposed between the screws 20 and said friction plugs. A handle 23 has a threaded opening whereby it is mounted on a threaded end portion of sleeve 19, the threads being left-handed.

A collar 24 keyed to the end of shaft 11 limits the outward movement of handle 23.

Hub 19 has an outwardly extending flange 25, best shown in Figs. 6 and 7, which is provided on opposite faces with teeth adapted to engage respectively with teeth on adjacent faces of hub 18 and of a sleeve 26. The sleeve 26 is splined to shaft 11 as indicated at 27 so as to prevent it from turning on said shaft. A friction disk 28 is loosely mounted on shaft 11 between the other end of sleeve 26 and the adjacent faces of hub 15, and another friction disk 28 is between the right hand end of hub 18 and the adjacent face of collar 13.

In the use of my device the disk 9 is secured to a spoked fly wheel by an appropriate number of bolts according to the number of spokes in the fly wheel, it being understood that it may be secured to other forms of fly wheel by providing the same with appropriate bolt holes of suitable number to permit firm attachment of the disk, and the other parts are mounted as indicated in Fig. 1. Engine fly wheels are usually made with 4—6 or 8 spokes, or in other words a multiple of either 3 or 4, so I make the disk with two sets of holes, spaced 3 in a circle and 4 in a circle which covers the complete range. The circular disk provides a safety feature as compared with former constructions in that it has no projecting parts to strike the operator.

If it be now desired to lower a measuring line into a well under control the handle is turned in a clockwise direction (viewed from the left in Fig 1) so as to cause its hub to bear against collar 24, whereby upon further rotation of the handle the hub 19 will move to the right since it is held frictionally against rotation with the handle by means of friction plugs 21 and is additionally held against rotation by engagement of the opposed teeth on flange 25 and sleeve 26 when said teeth come into engagement. This forces sleeve 26 toward hub 15 with the result that the reel is moved to the right so as to clamp the two friction disks 28 under equal tension between the opposed faces of the adjacent parts. In this way a suitable tension may be placed on the reel to permit the measuring line to unwind at the desired speed.

When the line is to be wound up by power the handle is turned further in a clockwise direction to move the sleeve 19 to the right and clamp the friction disks tight between the coacting faces of collar 13, hub 15 and sleeve 26 so that there is no slipping of these parts. The rotation of the shaft 8 and the parts connected thereto will now wind up the line in a positive and certain manner, without danger of wobbling of the reel so as to wind the line unevenly or to throw it off the reel, as has heretofore occurred frequently.

For winding a line by hand the handle 24 is turned in counterclockwise direction to lock the reel to the handle and release the engagement between the friction disks and the adjacent parts. The sleeve and handle being locked together and the friction disks being loose the reel is free to turn with the handle.

It will be obvious to those skilled in the art that various other modifications may be made in my device without departing from the spirit of my invention and, therefore, I do not limit myself to what is shown in the drawings and described in the specification but only as set forth in the appended claims.

Having thus fully described my said invention, what I claim as new and desire to secure by Letters Patent, is:

1. In a reel for measuring lines and the like, a shaft, spaced collars fixed to the shaft, a reel having a tubular body portion surrounding the shaft, a hub fixed in said body portion, a sleeve slidable on the shaft inside said body portion, friction means at opposite ends of the hub adapted to engage respectively with said sleeve and with one of said collars, and means for moving said reel and said sleeve axially of the shaft to apply braking friction to said reel, substantially as set forth.

2. In a reel for measuring lines and the like, a shaft, spaced collars fixed to the shaft, a reel having a tubular body portion surrounding the shaft, a hub fixed in said body portion, a sleeve slidable on the shaft inside said hub, clutching means on said hub and sleeve, and means for moving said sleeve endwise to engage said clutching means for driving the reel through said sleeve and hub, substantially as set forth.

3. In a reel for measuring lines and the like, a shaft, spaced collars fixed to the shaft, a reel having a tubular body portion surrounding the shaft, a hub fixed in said body portion, means to apply braking friction to said hub including a sleeve inside said tubular body slidable on said shaft, a flanged sleeve inside said tubular body having teeth adapted to engage teeth on the first-named sleeve, a hub surrounding said flanged sleeve and secured to said reel, clutch means on adjacent faces of said flanged sleeve and said last-named hub, frictional connections between said last-named hub and said flanged sleeve, and a handle having threaded engagement with a part of said flanged sleeve between one of said collars and the adjacent end of the reel whereby rotation of the handle in opposite senses serves respectively to apply a braking friction to the reel or to clamp the reel to said handle for manual operation of the reel, substantially as set forth.

4. In a reel for measuring lines and the like, a shaft, spaced collars fixed to the shaft, a reel having a tubular body portion surrounding the shaft, a hub fixed in said body portion, a sleeve slidable on the shaft inside said hub, means for clutching said hub and sleeve together for rotation, a handle, and connections between said handle and said sleeve whereby rotation of the handle in one direction serves to engage said clutching means and rotate the reel while rotation in the opposite direction disengages said clutching means.

5. The combination of a driven shaft, a fly wheel thereon, a disk at the end of the shaft and coaxial therewith said disk having bolt holes about its periphery at intervals of 90 degrees and two other bolt holes each 120 degrees distant from a bolt hole of the first-named set, bolts in said bolt holes connecting the disk to the fly wheel, a stationary shaft extending from said disk in coaxial relation with the disk and with said first-named shaft, said last-named shaft being held against rotation relatively to said driven shaft, a reel journaled on the second-named shaft, means for connecting the reel to the second-named shaft to rotate therewith, and means for rotating the reel independently of said shafts, substantially as set forth.

6. The combination of a driven shaft, a fly wheel thereon, a disk at the end of the shaft and coaxial therewith said disk having bolt holes about its periphery at intervals of 120 degrees and another set of bolt holes at intervals of 90 degrees one of said holes being common to both sets, bolts in said bolt holes connecting the disk to the fly wheel, a shaft extending from said disk in coaxial relation with the disk and with said first-named shaft, a reel on the second-named shaft, means for connecting the reel to the second-named shaft to rotate therewith, and means for rotating the reel independently of said shafts, substantially as set forth.

7. In a reel for measuring lines and the like, a shaft, a reel having a drum journaled directly thereon at one end, means for connecting the reel frictionally to said shaft for braking the reel, including friction elements within said drum, a handle for turning the reel, a clutch within said drum for connecting the reel positively to the handle, and connections from said handle to said clutch and said friction elements whereby rotation of the handle in one direction clutches the reel positively to the handle and relieves the friction on the reel, while rotation of the handle in the opposite direction releases the reel from the handle and applies braking friction thereto, substantially as set forth.

8. The combination of a shaft, a reel rotatable thereon said reel having a hollow drum, a sleeve journaled on said shaft and extending into said drum, an abutment on said shaft, a handle threaded on said sleeve between said abutment and said reel, means between said sleeve and drum for connecting the reel positively to the handle upon rotation of the handle in one direction whereby the reel may be rotated by the handle, braking means for the reel, and means acting through said sleeve for operating said braking means upon reverse rotation of the handle.

In testimony whereof I affix my signature.

CHARLES P. HARRISON.